Aug. 7, 1923.
W. S. MAKAROFF
MEANS TO INDICATE THE ANGULAR SPEED OF MOVING OBJECTS
Filed Feb. 21, 1918
1,464,208
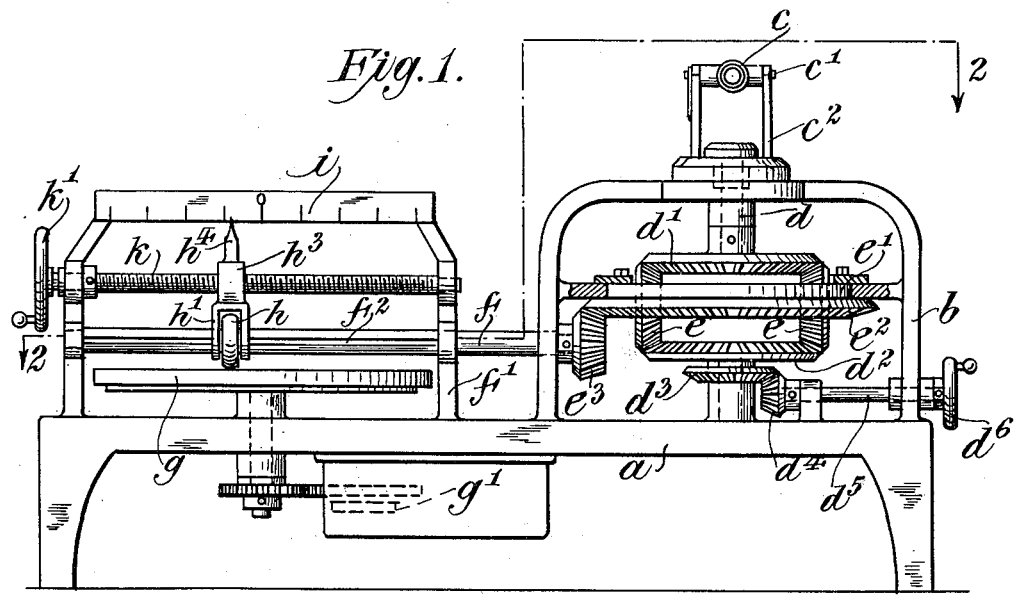
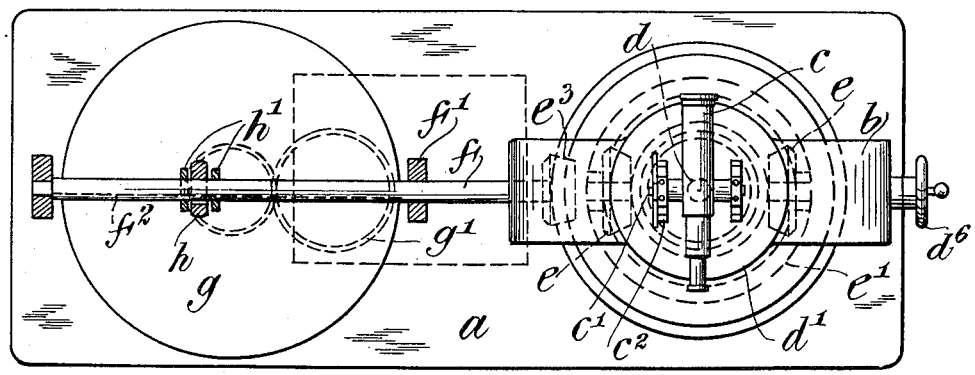

Patented Aug. 7, 1923.

1,464,208

UNITED STATES PATENT OFFICE.

WADIM S. MAKAROFF, OF NEW YORK, N. Y., ASSIGNOR TO THE FORD INSTRUMENT COMPANY, INC., OF NEW YORK, N. Y.

MEANS TO INDICATE THE ANGULAR SPEED OF MOVING OBJECTS.

Application filed February 21, 1918. Serial No. 218,488.

*To all whom it may concern:*

Be it known that I, WADIM S. MAKAROFF, a citizen of Russia, residing in the borough of Manhattan, of the city of New York, in the State of New York, have invented certain new and useful Improvements in Means to Indicate the Angular Speed of Moving Objects, of which the following is a specification, reference being had to the accompanying drawing, forming a part hereof.

This invention has for its object to produce a device whereby the angular speed of a distant moving object, with respect to the point at which the observer stands, may be indicated to the observer. The device can be used for different purposes and in different ways. Thus, for example, it might be used to indicate the angular speed of a warship, moving in a substantially horizontal plane, or it might be used to indicate the angular speed of an aeroplane, moving in a substantially vertical plane. It might thus be used as an adjunct to or in connection with fire control devices employed in the laying of guns upon moving targets, indicating to the observer the correction which should be made either in the bearing of an object which is moving horizontally, or in the elevation of an object which is moving in a vertical plane.

The invention will be more fully explained hereinafter with reference to the accompanying drawing in which a suitable embodiment thereof is illustrated, and in which—

Figure 1 is a view in front elevation of an instrument which embodies the invention.

Figure 2 is a view of the same partly in horizontal section on the plane indicated by the line 2—2 of Figure 1, looking downward.

The moving parts of the device may be mounted upon any suitable base which is shown in the drawing as a horizontal table $a$. Upon the table is mounted a frame $b$ which supports a sighting tube $c$ or other suitable sighting device which, in the present instance, is shown as mounted pivotally upon a horizontal axis $c'$ in a secondary frame $c^2$ which is supported upon the frame $b$ so as to be capable of movement about the vertical axis. The sighting tube $c$ is therefore capable of universal movement about the point of coincidence of the horizontal and the vertical axes referred to. The sighting device should be capable of being moved quickly by the observer so that it can be laid quickly upon the moving object and to be capable of being moved thereafter in accordance with the movement of the object so as to follow the same, that is, to be laid on the same during its movement. A gearing suitable for the accomplishment of this dual purpose is illustrated in the drawing and as there shown comprises a vertical shaft $d$, mounted in a suitable bearing in the frame $b$ and having secured at its upper end a secondary frame $c^2$. At its lower end the shaft $d$ has secured thereto one member $d'$ of an ordinary differential gearing. The corresponding member $d^2$ of this differential gearing is properly supported on the base $a$ and is adapted to be rotated conveniently by one hand of the observer. For this purpose it may have, as shown, a bevel pinion $d^3$ engaged by a corresponding bevel pinion $d^4$ on a shaft $d^5$ which is mounted in suitable bearings and may be provided, outside the frame, with a hand wheel $d^6$. The intermediate pinions $e$, $e$ of the differential gearing are carried by a spider $e'$ which is supported so as to be rotatable freely on the frame $b$ and has secured thereto, as usual, a bevel gear $e^2$ which is engaged with a bevel gear $e^3$ on a shaft $f$, whereby the sighting device may be made to follow the moving object through the rotation of the shaft $f$.

On the base $a$ is mounted a friction disc $g$ which is rotated at a constant speed from any suitable motor, such as a clock-train, indicated at $g'$. This friction disc, in the embodiment illustrated, constitutes a prime mover by which the sighting device may be made to follow the moving object.

The shaft $f$ may have suitable bearings in a frame $f'$ and is provided, between the bearings, with a long key or feather $f^2$, so that the friction wheel $h$, rotated by contact with the friction disc $g$, shall rotate the shaft $f$ at a speed proportionate to the distance of the friction wheel $h$ from the axis of rotation of the disc $g$ and shall be capable of being shifted toward or from the axis of rotation of the disc $g$ at either side of such axis. The friction wheel $h$ is engaged operatively by a yoke $h'$ carried by a traveling nut $h^3$, which also has a pointer $h^4$ for co-operation with a suitable scale $i$. The traveling nut $h^3$ is engaged by a screw-threaded shaft $k$ which is mounted in suitable bearings in the frame $f'$, parallel with the shaft $f$, and is provided, outside of the frame $f'$, with a hand wheel $k'$.

The mode of use of the improved device is as follows:

The screw shaft $k$ is rotated so as to cause the traveling nut $h^3$ to occupy its central position, with the pointer $h^4$ at zero on the scale $i$. The friction wheel $h$ will then stand in contact with the friction disc $g$ in line with the axis of rotation of the friction disc and the friction wheel will therefore stand still. The shaft $f$ will also be stationary and the gear $e^2$ and spider $e'$ of the differential gearing will also be stationary. Rotation of the gear $d^2$ of the differential gearing by the shaft $d^5$ and hand wheel $d^6$ will therefore enable the sighting device $c$ to be laid quickly upon the moving object, the sighting device being at the same time swung upon a horizontal axis. The sighting device having been laid upon the moving object, the observer, with his other hand, rotates the screw shaft $k$, in one direction or the other, until, through the shifting of the friction wheel $h$ upon the friction disc $g$ (which rotates at a constant speed), the shaft $f$ is driven at that speed which, through the gears $e^3$, $e^2$, the intermediate pinions $e$ and the gear $d'$, causes the sighting device to be moved about its vertical axis at the same angular speed as that which the moving object has with respect to the same axis. The gear $d^2$ can be moved at the same time, as may be necessary to enable the observer to keep the sighting device laid upon the object but the gear $d^2$ may be regarded as relatively stationary, so that the following movement of the sighting device is effected by the rotation of the shaft $f$. The pointer $h^4$, which travels with the nut $h^3$ and the friction wheel $h$, will therefore indicate, upon the scale $i$ the distance of the friction wheel $h$ from the axis of rotation of the friction disc $g$, and therefore the speed of rotation of the shaft $f$, and therefore the speed with which the sighting device swings about its vertical axis in following the moving object, and therefore the angular velocity of the moving object, and therefore, at any instant, the correction which must be made, by reason of the movement of the object, in laying the gun, for example.

If the apparatus is placed in the position shown in Figure 1, with the shaft $f$ horizontal and the axis of rotation of the differential gearing vertical, the device will indicate the change of bearing, that is, the angular speed in a horizontal plane, of the moving object, while if the device is placed with the axis of rotation of the differential gearing horizontal, the device may be used to indicate the angular speed in a vertical plane of the moving object.

It will also be understood that various modifications in details of construction and arrangement may be made to suit different conditions of use, if the instrument is used by itself, or in immediate conjunction with other instruments, such as fire control instruments, and that the invention, therefore, is not to be limited to the particular construction and arrangement of parts shown and described herein except as pointed out in the accompanying claims.

I claim as my invention:

1. An angular speed indicator comprising a sighting device movable about an axis, power operated means and transmission devices to move the sighting device about such axis and means to vary the speed of movement of the sighting device about its axis.

2. An angular speed indicator comprising a sighting device movable about an axis, power operated means and transmission devices to move the sighting device about such axis, means to vary the speed of movement of the sighting device about its axis, and an indicator to indicate the extent of such variation.

3. An angular speed indicator comprising a sighting device, a constant speed prime mover, shiftable transmitting devices between the prime mover and the sighting device whereby the sighting device may be made to move at different angular speeds, means to effect the shifting of the transmitting devices to vary the angular speed of the sighting device, and an indicator to indicate the extent of such shifting.

4. An angular speed indicator comprising a sighting device, a constant speed prime mover, shiftable transmitting devices between the prime mover and the sighting device whereby the sighting device may be made to move at different angular speeds, means to effect the shifting of the transmitting devices to vary the angular speed of the sighting device, an indicator to indicate the extent of such shifting, and independent means to move the sighting device.

5. An angular speed indicator comprising a sighting device, a friction disc rotated at a constant speed, a shiftable friction wheel co-operating with the friction disc, transmitting devices between the friction wheel and the sighting device, means to effect the shifting of the friction wheel with respect to the axis of rotation of the friction disc and an indicator to indicate the extent of such shifting.

6. An angular speed indicator comprising a sighting device, a friction disc rotated at a constant speed, a shiftable friction wheel co-operating with the friction disc, transmitting devices between the friction wheel and the sighting device, means to effect the shifting of the friction wheel with respect to the axis of rotation of the friction disc, an indicator to indicate the extent of such shifting, and independent means to move the sighting device.

7. An angular speed indicator comprising a sighting device, a differential gearing by one member of which the sighting device is carried, means to rotate the corresponding member of the differential gearing to move the sighting device and power operated means to drive the intermediate member of the differential gearing at a speed in accordance with the angular speed of the sighting device.

8. An angular speed indicator comprising a sighting device, a friction disc rotated at a constant speed, a shiftable friction wheel co-operating with the friction disc, a differential gearing driven by said friction wheel, said sighting device being carried by one member of said differential gearing, and independent means to drive the other member of said differential gearing.

This specification signed this 20th day of February, A. D. 1918.

WADIM S. MAKAROFF.